3,241,517
CEMENT APPLYING APPARATUS
Alfred T. Hooper, Brockton, Mass., assignor to Jacob S. Kamborian, West Newton, Mass.
Filed May 14, 1963, Ser. No. 280,259
11 Claims. (Cl. 118—1)

This invention is directed to an apparatus for depositing cement on a workpiece and, more specifically, to depositing a ribbon of molten thermoplastic cement on a shoe insole prior to adhesively bonding the shoe upper to the insole in a lasting machine such as that disclosed in pending application Serial No. 231,756 filed October 19, 1962. Application Serial No. 231,756 and the instant application presently have a common assignee.

The apparatus includes a well containing a pool of the cement in liquid form and an applicator that is normally immersed in the pool. A plunger extends upwardly of the well and a linkage is provided that interconnects the applicator and well whereby depression of the plunger by the insole causes the applicator to rise and deposit cement on the insole. A stud extending upwardly of the pool of cement between the sides of the applicator has a top that is at a lower level than the uppermost position of the applicator and serves to break any film that may extend across the applicator after it has arisen from the pool.

Figure 1:
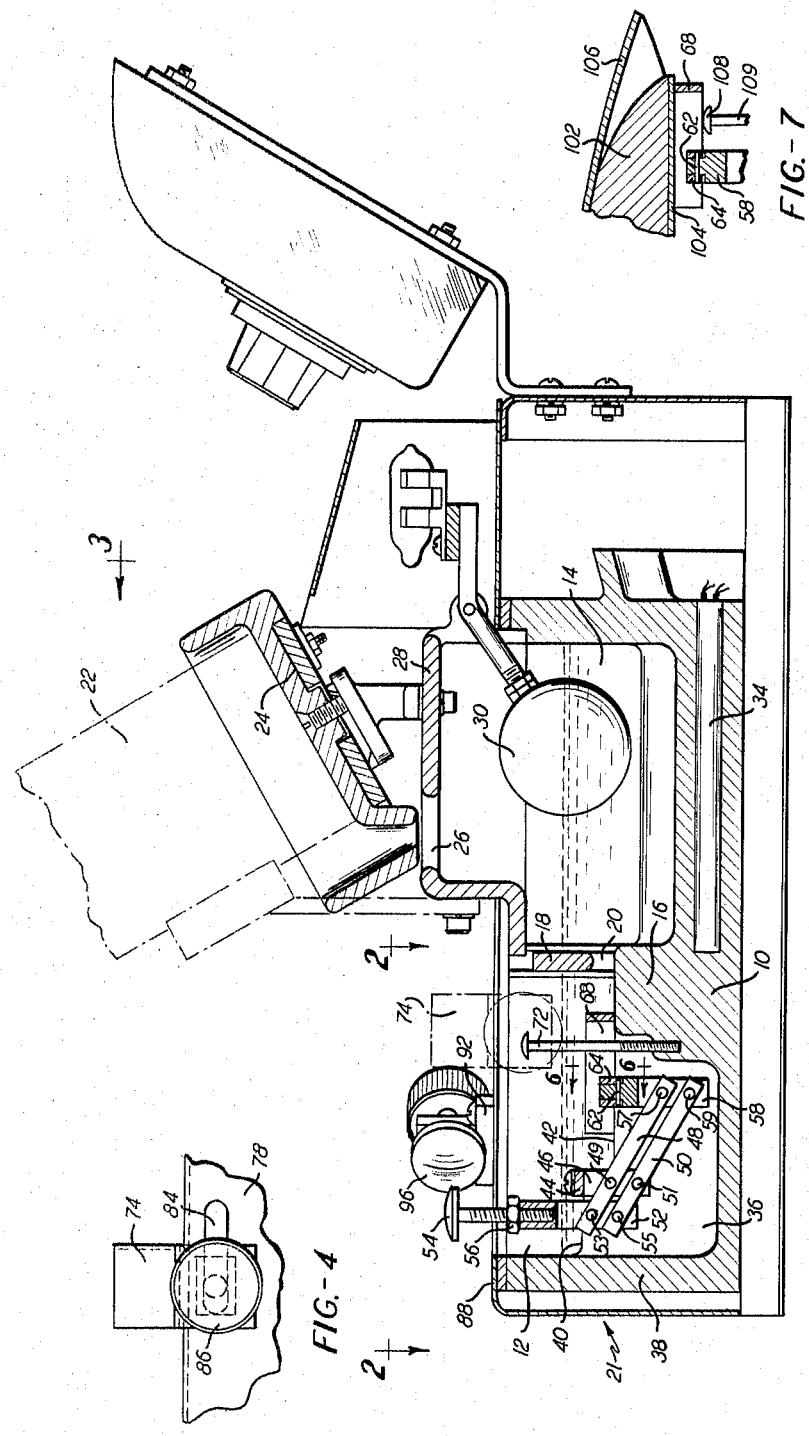
Figure 2:
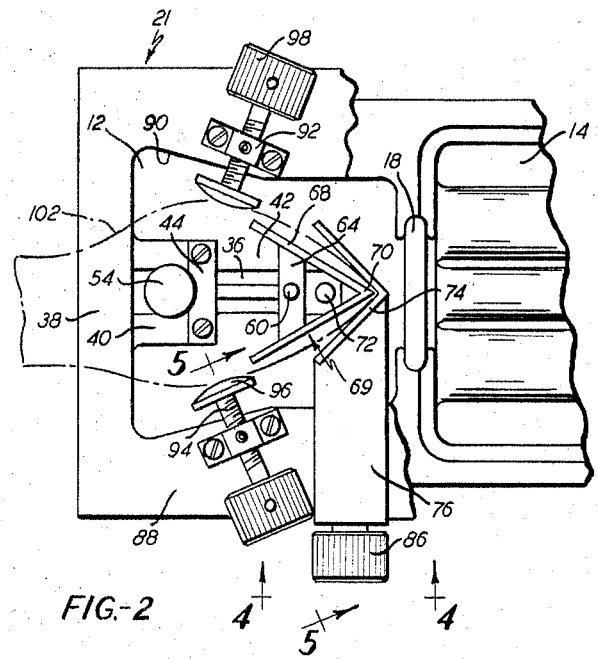
Figure 6:
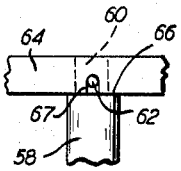
Figure 5:
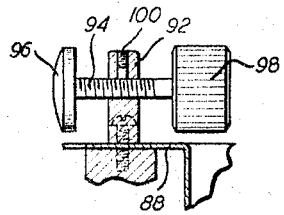
Figure 8:
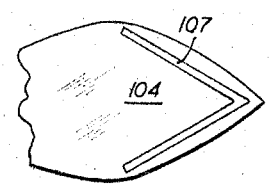
Figure 3:
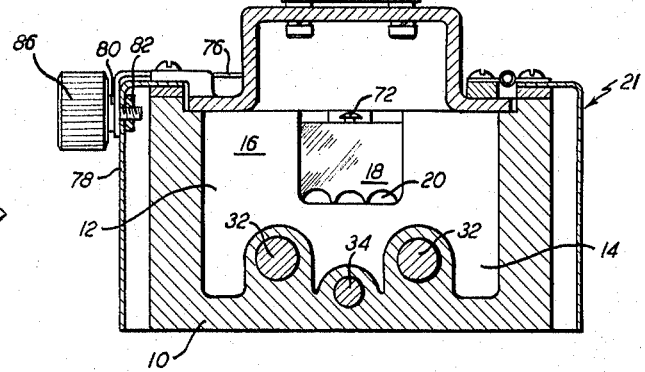

In the accompanying drawings:

FIG. 1 is a side elevation, partly in section, of the apparatus;
FIG. 2 is a plan view taken on the line 2—2 of FIG. 1;
FIG. 3 is a section taken on the line 3—3 of FIG. 1;
FIG. 4 is a detail taken on the line 4—4 of FIG. 2;
FIG. 5 is a detail taken on the line 5—5 of FIG. 2;
FIG. 6 is a detail taken on the line 6—6 of FIG. 1;
FIG. 7 is a schematic representation of the shoe as the applicator deposits cement on its insole; and
FIG. 8 is a showing of the insole after the cement has been deposited thereon.

The apparatus comprises a casting 10 that has a well 12 therein that is open to the top of the casting. A chamber 14 in the casting is separated from the well 12 by a lip 16. A gate 18 in the lip permits molten cement to flow through openings 20 in the gate from the chamber 14 into the well 12. A cover 21 extends along the top and sides of the casting 10.

Cement is supplied to the chamber 14 from a solid stick 22 from which it is melted from the bottom by an electric heating element 24. The molten cement flows from the element 24, through an opening 26 in the top 28 of the chamber 14, into the chamber. A float 30 controls the turning on and off of the heating element 24 so that the molten cement is supplied to the chamber 14 at a rate commensurate with the rate that the cement is removed from the well 12 and maintains a pool of molten cement in the well at a substantially uniform level. Reference is made to Patent No. 3,011,042 for a fuller disclosure of the apparatus for supplying the molten cement to the chamber 14.

The casting 10 has electric cartridge heaters 32 therein for maintaining molten the cement in the well and chamber and a thermostat 34 for controlling the cartridge 32.

A channel 36 extends along the bottom of the well 12 from the rear wall 38 of the casting 10 to the lip 16. Ledges 40 bound the channel 36 at its rear end adjacent the wall 38, and ledges 42 bound the channel forwardly of the ledges 40 and extend up to the lip 16. The ledges 40 are at a higher elevation than the ledges 42.

A bracket 44, secured to the ledges 40 to straddle the channel 36, has a flange 46 extending downwardly into the channel. A pair of links 48 and 50 are pivoted to the bracket flange 46 intermediate their ends by pivots 49 and 51. The rear ends of the links 48 and 50 are pivoted by pivots 53 and 55 to a plunger 52 that extends upwardly of the channel 36. A button 54 is threaded into the plunger 52 and is adjustably secured therein by a lock nut 56. The forward ends of the links 48, 50 are pivoted by pivots 57 and 59 to an applicator holder 58 that extends upwardly of the channel 36. The upper end of the holder 58 is formed into a smaller diametered projection 60 (FIG. 6) through which a pin 62 extends. The projection 60 is received in a hole in a bar 64 so that the bottom of the bar is seated on the ledge 66 formed at the base of the projection 60. The bar 64 has arcuate cutouts 67 to accommodate the pin 62. The bar 64 is connected at its opposite ends to an applicator blade 68 that has forwardly converging sides meeting at an apex 70. The bar 64 and blade 68 comprise a cement applicator 69. The upper surface of the blade 68 is in a horizontal plane that is at a higher level than the upper surface of the bar 64. A headed stud 72 is threaded into the base of the channel 36 and extends upwardly thereof between the bar 64 and the blade apex 70.

A front gage 74 extends over the top of the well 12 forwardly of the application blade 68. The gage 74 is comprised of two forwardly converging walls that subtend a larger angle than the sides of the blade 68. The gage 74 is mounted on a bar 76 that is pressed against a side wall 78 of the cover 21 by a bolt 80 and is locked to the cover 78 by a nut 82 threaded onto the bolt (FIG. 3). The bolt is slidable in a slot 84 (FIG. 4) in the cover wall 78 so that the gage 74 may be adjusted forwardly and rearwardly by loosening the bolt by way of a knob 86 on the bolt and adjusting the position of the bolt in the slot.

The top wall 88 of the cover 21 has an opening 90 overlying the well 12 on which mounting brackets 92 are secured. A bolt 94, having a side gage button 96 at its inner end, is threaded into each bracket 92 so that the gage buttons overlie the well on each side of the well rearwardly of the application blade 68 and front gage 74. The gage buttons 96 may be moved inwardly and outwardly by rotating knobs 98 on the bolts 94 and may be locked in position by set screws 100 (FIG. 5).

In the operation of the apparatus, a shoe assembly is provided that comprises a last 102 having a shoe insole 104 located on its bottom and a shoe upper 106 draped over its toe end (see FIG. 7). The front gauge 74 and the side gauges 96 are adjusted as described above for the particular shape of the last. A cement applicator 69 having a configuration dependent on the configuration of the edge of the insole is seated on the ledge 66 with the cutouts 67 resting on the pin 62. The engagement of the pin 62 with the walls of the cut-outs 67 prevents twisting of the applicator 69 about the axis of the projection 60.

The links 48 and 50 form a parallel linkage mechanism between the plunger button 54 and the applicator blade 68 so that depression of the button will cause it to move downwardly in a vertical plane and cause the blade to rise in a vertical plane with the upper surface of the blade maintained constantly in a horizontal plane and the rate of rise of the blade proportioned to the rate of descent of the button. The distance between the pivots 49, 51, the pivots 53, 55 and the pivots 57, 59 and the weights of the members supported on the pivots 53, 55 and the pivots 57, 59 are such that in the idle condition of the apparatus the applicator is in a lowered position resting on the ledges 42 and the lip 16 and the plunger button 54 is in an elevated position above the top cover wall 88. The molten cement in the well 12 is maintained at a level that is above the applicator blade 68 in its lowered position and that is below the top of the stud 72 and below the top of the well 12.

The shoe assembly is presented above the well 12 with the toe end of the last bearing against the front gauge 74 and the sides of the last bearing against the side gauge buttons 96 as indicated in phantom in FIG. 2. The bottom of the insole 104 is brought to bear against the plunger button 54 and the operator lowers the shoe assembly to force the plunger 52 downwardly and thereby raise the applicator blade 68 out of the pool of molten cement to cause it to bear against the insole as indicated in FIG. 7 to deposit a ribbon of cement 107 (FIG. 8) on the insole adjacent the marginal edge of the insole. The applicator blade in rising out of the pool against the insole carries cement up with it which drains off the blade as the blade rises. The more rapid the rate of rise of the blade, the less the amount of cement that will drain off it. The amount of cement that will drain off the blade during its rise is dependent on the composition of the cement, its viscosity, and its temperature. Since the operator can control the rate of rise of the applicator blade by controlling the rate that he causes the insole 104 to depress the plunger 52, he can to some degree control the quantity of cement deposited on the insole. Since the blade is constantly maintained in a horizontal plane during its rise, it is always in a position to bear flush against the insole 104. The insole during this procedure is supported on its bottom only by the plunger button and the applicator blade since the plunger button is at all times maintained above the level of the top casing wall 88.

After the applicator blade has been elevated against the insole for a sufficient period of time, the operator removes the shoe assembly so that the plunger button 54 rises and the applicator blade 68 returns to its lowered position. The operator now presents the shoe assembly to a toe lasting machine such as that disclosed in the aforementioned application Serial No. 231,756 wherein the upper 106 at the toe is wiped against the insole 104 and adhesively bonded to the insole by way of the ribbon of cement 107.

The head 108 of the stud 72 (FIG. 7), which is of larger diameter than the stud shank 109, is located above the pool of molten cement and below the upper limit of travel of the applicator blade 68. Should a film of cement extend across the open space between the converging sides of the applicator blade 68 and the bar 64 after the blade has risen from the pool of cement, the film is broken by the stud head 108 so that it is not deposited on the insole. The stud thus ensures that the deposited cement on the insole is limited to the marginal areas indicated in FIG. 8 which are to be subsequently bonded to the upper.

It should be understood that the present disclosure is for the purpose of illustration only and that this invention includes all modifications and equivalents which fall within the scope of the appended claims. Although the disclosed operative embodiment of the invention relates to depositing a ribbon of cement on the marginal edge of the toe portion of a shoe insole, the invention obviously has utility in other applications wherein it is desired to deposit cement on a workpiece.

Terms such as "vertical" and "horizontal" are intended to designate the relative positions and paths of movement of the parts and should be construed accordingly.

I claim:

1. An apparatus for applying cement to the bottom of a workpiece comprising: a well adapted to contain a pool of liquid cement; an applicator in the well that is normally immersed in the pool; a plunger extending upwardly of the well with the upper surface of the plunger exposed so that the bottom of the workpiece may be brought to bear against the plunger; and joining means interconnecting the plunger and applicator so constructed and arranged as to normally maintain the applicator in said immersed position and to cause the applicator to rise from the pool while constantly being maintained in a horizontal plane in response to downward movement of the plunger by the workpiece, thereby enabling the rising applicator to apply cement to the workpiece bottom.

2. An apparatus for applying cement to the bottom of a workpiece comprising: a well adapted to contain a pool of liquid cement; an applicator in the well that is normally immersed in the pool; a plunger extending upwardly of the well with the upper surface of the plunger exposed so that the bottom of the workpiece may be brought to bear against the plunger; and joining means interconnecting the plunger and applicator so constructed and arranged as to normally maintain the applicator in said immersed position and to cause the applicator to rise from the pool in response to downward movement of the plunger by the workpiece at a rate that is proportioned to the rate of downward movement of the plunger with the applicator being constantly maintained in a horizontal plane, thereby enabling the rising applicator to apply cement to the workpiece bottom.

3. The apparatus according to claim 2, wherein the plunger and adjoining means are so constructed that the plunger in moving downwardly has its axis maintained in a vertical direction.

4. The apparatus according to claim 1 further comprising: a front gage above the well positioned forwardly of the path of movement of the applicator.

5. The apparatus according to claim 4 further comprising: means for adjusting the front gage forwardly and rearwardly so as to accurately locate it with respect to the path of movement of the applicator.

6. The apparatus according to claim 4 further comprising: a side gage located above the well on each side thereof rearwardly of the front gage.

7. A cement applying apparatus comprising: a well adapted to contain a pool of liquid cement; a pair of parallel links fulcrumed intermediate their ends in the well; an applicator holder pivotally connected to the forward ends of the links so that it extends upwardly thereof; an applicator mounted on the holder; a plunger pivotally connected to the rearward ends of the links so that it extends upwardly thereof; the aforesaid parts being so constructed that the applicator is normally in a lowered position immersed in the pool and the plunger is normally in an elevated position, whereby upon depression of the plunger by a workpiece the applicator is raised upwardly of the pool to deposit cement on the workpiece.

8. A cement applying apparatus comprising: a well adapted to contain a pool of liquid cement; a channel extending longitudinally of the well bottom; ledges bounding the sides of the channel; an applicator in the well straddling the ledges that is normally immersed in the pool and resting on the ledges; a plunger extending upwardly of the well; and joining means interconnecting the plunger and applicator and extending into the channel so constructed and arranged as to normally maintain the applicator in said immersed position resting on the ledges and to cause the applicator to rise from the ledges and the pool in response to downward movement of the plunger.

9. A cement applying apparatus comprising: a well adapted to contain a pool of liquid cement; a channel extending longitudinally of the well bottom; ledges bounding the sides of the channel; an applicator in the well that is normally immersed in the pool and resting on the ledges; a pair of parallel links fulcrumed intermediate their ends in the well with their forward ends extending into the channel below the applicator; an applicator holder pivotally connected to the forward ends of the links so that it extends upwardly thereof in the channel; means mounting the applicator on the holder; and a plunger pivotally connected to the rearward ends of the links so that it extends upwardly thereof, whereby upon depression of the plunger by a workpiece the applicator is raised upwardly of the pool to deposit cement on the workpiece.

10. A cement applying apparatus comprising: a well adapted to contain a pool of liquid cement; an applicator blade, having a pair of spaced side portions, located in the well; means mounting the blade for movement from a lower position wherein it is immersed in the pool to an elevated position wherein it deposits cement on a workpiece located above the pool; and a stud upstanding from the well bottom between said side portions having a top located above the pool and below said elevated position, said stud including a shank secured in the well bottom and said stud stop comprising a head of larger diameter than the shank.

11. A cement applying apparatus comprising: a well adapted to contain a pool of cement; an applicator located in the well, said applicator having a pair of converging sides and a bar connected at its opposite ends to said sides; means mounting the applicator for movement from a lower position wherein it is immersed in the pool to an elevated position wherein the applicator sides deposit cement on a workpiece located above the pool; a stud upstanding from the well bottom between the applicator sides and bar having a top located above the pool and below said elevated position, said stud including a shank secured in the well bottom and said stud top comprising a head of larger diameter than the shank.

References Cited by the Examiner

UNITED STATES PATENTS

| | | | |
|---|---|---|---|
| 1,194,244 | 8/1916 | Schwartz et al. | 118—1 |
| 1,634,500 | 7/1927 | Hothersall | 118—203 X |
| 1,815,480 | 7/1931 | Neal | 118—205 |
| 2,171,731 | 9/1939 | MacKenzie | 118—205 |

CHARLES A. WILLMUTH, *Primary Examiner.*

L. G. MACHLIN, *Assistant Examiner.*